US007138796B2

(12) United States Patent
Miya

(10) Patent No.: US 7,138,796 B2
(45) Date of Patent: Nov. 21, 2006

(54) ROTATION ANGLE SENSOR

(75) Inventor: Taiichi Miya, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 35 days.

(21) Appl. No.: 10/840,503

(22) Filed: May 7, 2004

(65) Prior Publication Data
US 2005/0057245 A1 Mar. 17, 2005

(30) Foreign Application Priority Data
May 9, 2003 (JP) .............................. 2003-131755

(51) Int. Cl.
*G01B 7/30* (2006.01)
*G05B 1/06* (2006.01)
(52) U.S. Cl. .................. 324/207.25; 318/661
(58) Field of Classification Search ........... 324/207.25, 324/207.17, 207.15, 207.22; 310/168, 112, 310/166, 114, 106; 318/661
See application file for complete search history.

(56) References Cited
U.S. PATENT DOCUMENTS
4,763,051 A * 8/1988 Ruppert ..................... 318/254

5,041,749 A * 8/1991 Gaser et al. ............ 310/156.22
5,150,115 A * 9/1992 deJong et al. ......... 340/870.31
5,428,290 A * 6/1995 Porcher .................. 324/207.16
5,444,368 A * 8/1995 Horber ................... 324/207.16
2002/0036495 A1* 3/2002 Hannewald et al. ...... 324/207.2

FOREIGN PATENT DOCUMENTS

| EP | 0 512 282 A1 | 4/1992 |
| JP | A-2000-018968 | 1/2000 |
| JP | A-2001-183169 | 7/2001 |

OTHER PUBLICATIONS
European Search Report issued on Dec. 22, 2005 from the European Patent Office for the corresponding European patent application No. 0401077.9.

\* cited by examiner

*Primary Examiner*—Edward Lefkowitz
*Assistant Examiner*—Kenneth J. Whittington
(74) *Attorney, Agent, or Firm*—Adduci, Mastriani & Shaumberg, LLP.

(57) ABSTRACT

A rotation angle sensor that outputs different axis combination angles as absolute position information by forming a range of salient poles that have different axis combination angles from each other on the rotor and the stator.

13 Claims, 8 Drawing Sheets

ROTATION ANGLE SENSOR

CROSS REFERENCE TO RELATED APPLICATION

This application is based on and incorporates by reference Japanese Patent Application No. 2003-131755, which was filed on May 9, 2003.

BACKGROUND OF THE INVENTION

The present invention relates to a rotation angle sensor having a variable reluctance resolver (hereinafter referred to as a VR resolver) for an axis combination angle 1X (single combination angle) and a VR resolver for an axis combination angle nX (n combination angle) wherein, n is 2 or an integer greater than 2.

Conventionally, resolvers, and other angle measuring devices, for which the axis combination angle is 1X, have primarily been used as a location detector. The axis combination angle is the ratio of the output electrical angle relative to the input mechanical angle of the detector. For example, when n multiplied by mechanical angle θ1=electrical angle θ2, the axis combination angle is indicated as nX (n combination angle).

First, the structure of a conventional resolver is described. FIGS. 5A and 5B show a representative conventional resolver.

The stator windings 101 in FIG. 5A are formed consecutively via crossing hooks 103 arranged on the stator yokes 102. The ends of the stator windings 101 are connected together and coupled to the connector portion 104. The shapes of the salient poles of the rotors 105 are formed in a way such that changes of the gap permeance in the direction of the circumference are appropriate. Accordingly, the amplitude of the output signal of the stator windings 101 corresponds to a sine wave with seven cycles per rotation depending on the position of the rotors 105. In this example, there are seven salient poles on the rotors 105.

Japanese Unexamined Patent Application Publication 2001-183169 discloses that such a position detector has the following problems.

A resolver with an axis combination angle 1X allows simultaneous detection of the angle, the magnetic pole and the original point by resolver/digital (R/D) converting a two-phase signal that is changed to a sine wave. The sine wave has a 90-degree phase shift per single cycle for each rotation of the axis. However, to obtain high resolution, the resolution of the R/D converter has to be increased, which is costly. Although the absolute position can be detected, the precision of detection depends on the electrical precision of the resolver. In other words, at all rotation angles, the manufacturing error and the temperature error directly affect the electrical precision. In addition, to improve the precision of the detection, the precision of the analog signal has to be increased. However, due to the effect of the winding precision included in the signal, the detection of the angle position at a high precision is difficult. Consequently, a position detector is more expensive and difficult to employ compared to a general resolver.

Furthermore, when the axis combination angle is increased, for example, when the axis combination is set to be 100×, 100 times precision can be obtained. If the signal precision is the same, however, implementation applications are limited to, for example, multiple motors, where the number of rotors is one hundred.

At the same time, when the application is focused on a multi-use motor with a low number of poles, position detection with high precision can be obtained. What has been proposed is a combination of a position detector with a small axis combination angle and a position detector with a large axis combination angle.

FIG. 6A shows a conventional multi-speed resolver system. FIG. 6B is illustrates the relationship of the output signals of the double resolver. FIG. 6C is an explanatory drawing that describes a method to find the rotation angle for the multiple-speed resolver system of FIG. 6A.

As shown in FIG. 6A, a multi-speed resolver system includes a resolver 110 and a digital converter 114. Depending on the application, an analog converter can be employed instead of the digital converter 114. In the resolver 110, the output of resolver 112 with an axis combination angle nX that is directly connected to the rotation shaft 111 becomes an axis combination angle nX resolver signal. The output of resolver 113 with axis combination angle 1X, which is connected to rotation shaft 111 with a mechanical device such as a gear system, is an axis combination angle 1X resolver signal.

The digital converter 114 carries out the following process. The axis combination angle nX resolver signal is converted to the sawtooth wave at the bottom of FIG. 6C by the R/D converter 115 in advance. The axis combination angle 1X resolver signal is converted to one of the triangular waves at the top of FIG. 6C via the R/D converter 116. Then both of the signals are recorded by the synthesizing circuit 117. Next, both resolver signals at the measuring point are input, and, based on the axis combination angle 1X resolver signal Ak, angle θk is found from the triangular wave at the top of FIG. 6C. The rotation angle Bak corresponds to the axis combination angle nX resolver signal Bk measured from the peak of the sawtooth wave (single triangular wave) of the axis combination angle nX resolver signal corresponding to angle θk.

FIG. 6B is an exemplary illustration of each of the resolver signals and indicates the sinusoidal resolver outputs. FIG. 6B indicates the relationship between the sine signal wave of the axis combination angle 1X resolver and the sine signal of the axis combination angle nX resolver (when n=2).

When two resolvers are employed as in FIG. 6A, the required space increases and the generation of a mechanical processing error is inevitable. In addition, a gear connection is arranged at the joint of the shaft, so the axial length of the shaft increases.

Therefore, instead of using two resolvers with the same axis combination angle, position detection at a high precision is carried out by combining a position detector with a small axis combination angle and a position detector with a large axis combination angle. However, the position detector uses magnetism and light, and therefore in general, it is difficult to obtain a sine wave signal with a long cycle. In addition, the manufacturing of a small axis combination angle is simple for a differential-mode transformer-type resolver. However, when a resolver with a large axis combination is manufactured, the number of winding poles increases, and consequently, manufacturing is complicated and the size increases.

To obtain a high detection resolution by eliminating the problems in the prior art position detector discussed above, a multi-speed resolver with multiple poles is disclosed in the same Japanese publication (Japanese Unexamined Patent Application Publication 2001-183169), as shown in FIG. 7. FIG. 7 shows a conventional multi-speed resolver with multiple poles.

In the example of FIG. 7, two resolvers are arranged in parallel on the rotation shaft. A first resolver 122 has a rotor iron core 121 with an axis combination angle 50X, which has 50 rotor teeth. A second resolver 124 has a rotor iron core 123 with an axis combination angle 49X and has 49 rotor teeth. A value L is found by subtracting detected position value K of the 49th cycle of the second resolver 124 from the detected position value J of the 50th cycle of the first resolver 122. Then, the value N, which is L times M, is obtained from the following judgment conditions. In other words, the detected position value N of the axis combination angle 1X, is found.

$N = L \times M$ wherein, when $L \geq 0$, $E=0$; and when $L<0$, $E=360°$.

In the Japanese publication mentioned above, forty-nine and fifty teeth have to be provided respectively on the rotors, accurately and in alignment. The multi-speed resolver requires a processing circuit to produce the output signal of the axis combination angle 1X by finding the difference of the axis combination angle based on the number of teeth. Numerous teeth have to be formed on the stator in correspondence with the teeth of the rotor, and consequently, the manufacturing is difficult.

SUMMARY OF THE INVENTION

By taking the above-mentioned problems into account, the present invention has the objective of providing a rotation angle sensor that produces outputs for different axis combination angles as absolute position information by forming a range of different axis combination angles on the rotor and the stator with a simple structure.

The rotation angle sensor has two resolvers with different axis combination angles on one rotor and one stator in each resolver, so that the output of both resolvers can be extracted in order to create the absolute position information.

The rotation angle sensor is characterized in that a shape for the salient poles of the rotor included in a designated range occupies 180 degrees or less of the circumference. A configuration for a plurality of stator magnetic poles having a stator winding on the stator yoke is employed so that each of the ranges has a different axis combination angle.

The rotation angle sensor is further characterized in that the designated angle of each range is set to be 90 degrees. One of the different axis combination angles is set to be a single combination angle. The other axis combination angle is set to be a double or greater combination angle.

The rotation angle sensor is further characterized in that the rotor is structured so that a plurality of rotor elements having salient poles that correspond to each of different axis combination angles are combined so that the salient pole regions do not overlap with each other. The stator magnetic poles are arranged in correspondence with the rotor elements.

The rotation angle sensor is further characterized in that the stator yoke is structured so that the stator yoke elements in which the plurality of stator magnetic poles are located, are combined so that they do not overlap with each other.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

The present invention relates to a rotation angle sensor using a resolver that includes a rotor and a stator that are arranged so that, in general, a plurality of measurement (salient pole) ranges with different axis combination angles from each other do not overlap. In other words, the resolver is arranged such that each salient pole range occupies an angle of less than 180 degrees. Preferably, the resolver has a 1X axis combination angle and an nX axis combination angle and salient pole measurement ranges of ninety degrees.

A first embodiment includes a rotor 14, in which ranges with different axis combination angles are formed on the same plane of a single rotor element and is described with reference to FIGS. 1A–2C.

Figure 2B:
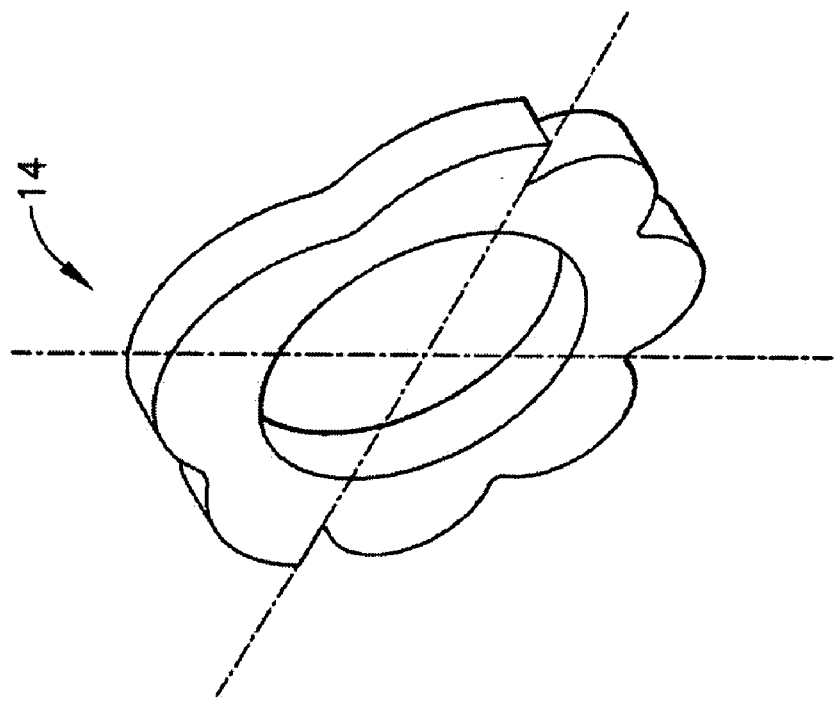
FIG. 2B is a perspective view of the rotor in FIG. 2A.
Figure 2A:
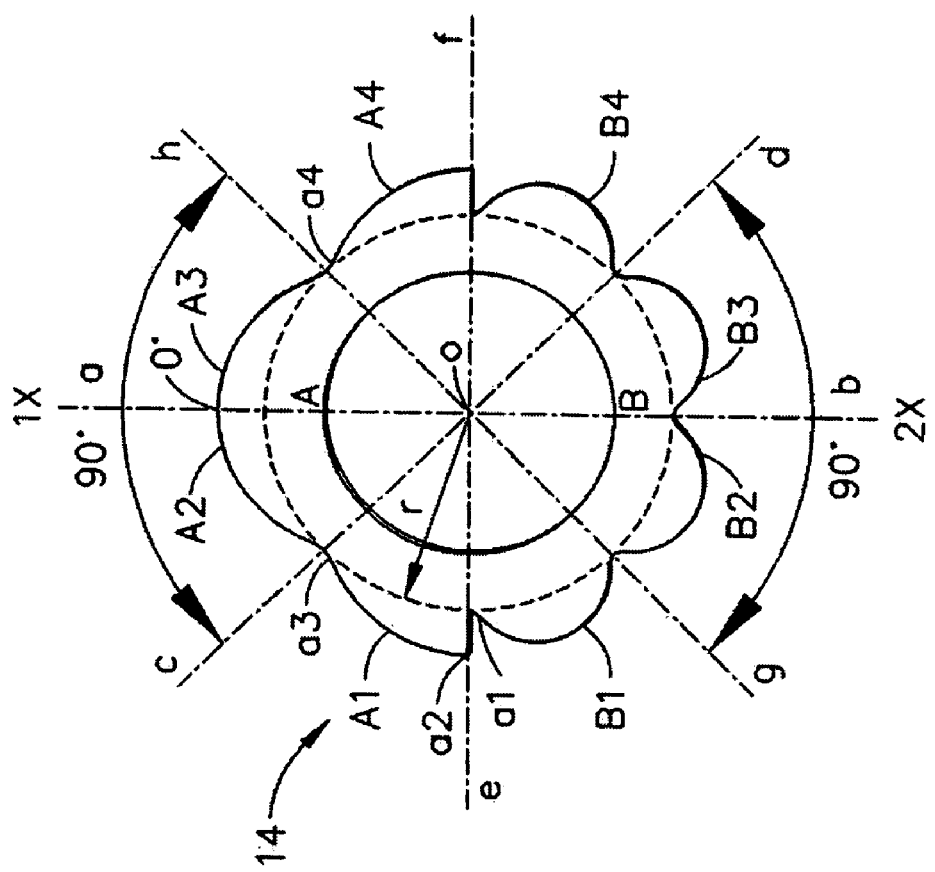
FIG. 2A is a schematic end view of a 1X/2X rotor of the present invention.
Figure 2C:
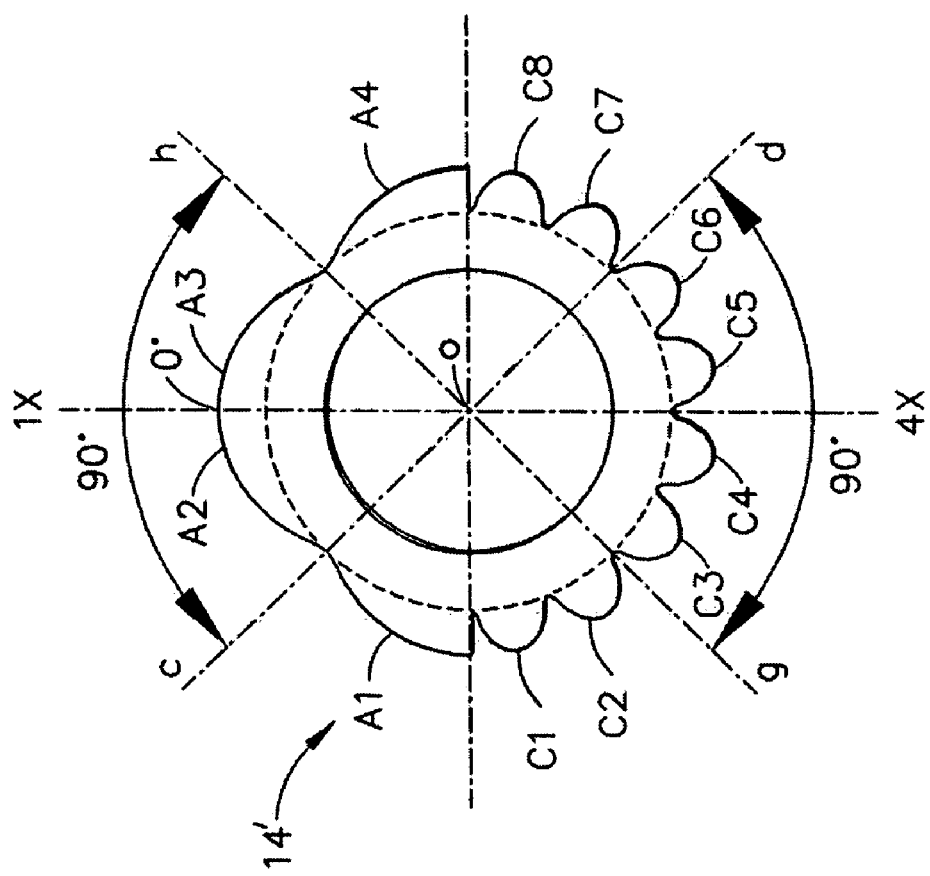
FIG. 2C is a schematic end view of a 1X/4X rotor of the present invention.

FIG. 2A shows a 1X/2X type rotor having salient poles with an axis combination angle 1X on one side, and salient poles with an axis combination angle 2X on the bottom portion. FIG. 2C shows a 1X/4X type rotor having salient poles with an axis combination angle 1X on the top portion and salient poles with an axis combination angle 4X on the bottom portion. In FIGS. 2A and 2C, the vertical line intersecting the center axis o of the shaft is set to be zero degrees (reference point), clockwise is considered to be the positive direction, and counterclockwise is considered to be the negative direction. The unitary type rotor 14 of FIGS. 2A and 2B has a predetermined thickness.

The shape of the salient poles of the rotor 14 in FIG. 2A is formed such that the upper half (+90° to −90°), or a first area, is set to have a 1X axis combination angle. The first area of the rotor is divided into poles A1, A2, A3 and A4, each of which has a forty-five degree angle, as shown. The lower half, or second area, is set to have a 2X axis combination angle, which is divided into salient poles B1, B2, B3, and B4, each of which has a forty-five degree angle, as shown.

The first and second rotor areas with different axis combination angles are arranged, in principle, so that they do not overlap. In other words, they are arranged in areas with a 180-degree angle or less, and the two areas are opposite to one another with regard to a plane that passes through the central axis o. In particular, it is preferable to set first and second measurement areas of the first and second areas in opposed ninety-degree ranges.

An axis combination angle 1X is defined such that the output of the secondary windings of the stator has a single cycle per one rotation of the shaft. That is, the gap permeance between the salient poles of the rotor and stator magnetic poles having stator windings changes one cycle per one rotation. Therefore, when a stator magnetic pole is arranged peripherally of the rotor, the rotor is formed with a special arc so that the salient poles of the rotor makes one cycle of gap permeance variation.

The external arcs of the salient pole A1 and salient pole A3 have the same shape, and the external arcs of the salient pole A2 and salient pole A4 have the same shape. The salient poles A1 and A2 are symmetrical with respect to the salient poles A3 and A4 with respect to the line ab, as shown. In principle, the salient poles have the same shape. For example, salient pole A1 is formed with a segment a1a2 on the line that passes through the shaft center o and an arc that is from the point a2 to the point a3 on the circumference of a circle, the radius of which is r. The salient pole A2 is a mirror image of the salient pole A1 with respect to the line cd, which passes through the shaft center o. The salient pole A3 is a mirror image of the salient pole A2 with respect to the line ab. The salient pole A4 is a mirror image of the salient pole A3 with respect to the line gh, which passes through the shaft center o. In addition, the salient pole A4 is a mirror image of the salient pole A1 with respect to the line ab.

A one-cycle sine wave of the axis combination angle 1X area can be formed by measuring the changes in the gap permeance output as long as there is an area in which salient pole A2 and salient pole A3 are continuously formed with respect to the zero point (0°) without having discontinuity in the gap permeance output. In other words, the measurement area has an angle of plus or minus forty-five degrees (±45°, or a total of 90°) about the zero point. A single cycle of sine wave output of the stator winding can be formed and the output of the axis combination angle 1X can be obtained without having an excess or deficiency during the operation.

At the same time, the salient pole A1 and salient pole A4 in the first area are arranged in a divided manner as preliminary measurement areas before and after the measurement range area, which includes the salient pole A2 and salient pole A3. The reasons for this preliminary measurement area including salient pole A1 and salient pole A4 is as follows.

The preliminary measurement areas make it easier to determine the starting point and ending points of the measurement area (salient pole A2 and salient pole A3). Also, forming the salient pole A1 and salient pole A4 in the same salient pole pattern as those in the measurement range allows simplified manufacturing. Further, the transformation pattern of the gap permeance to be measured can be specified as having only two types, which are a 1X type and 2X type.

In other words, if the salient pole A1 and salient pole A4 are not formed with the particular arc shown in FIG. 2A, for example, and if they are formed as arcs of a circle with radius r from the axis o, then these arcs will have the same radius r as the starting point a3 and ending point a4 of the measurement range. Consequently, the gap permeance will not vary throughout these sections. As a result, determining the starting point a3 and ending point a4 will be difficult. In addition, a comparison of a pattern other than the pattern of the salient poles of the 1X axis combination angle and the pattern of the salient poles of the 2X axis combination angle is required, thus increasing the comparison steps.

The axis combination angle 2X area, or the second area, is defined by the lower part in FIG. 2A with respect to the horizontal line ef, and the 2X axis combination angle area has four salient poles B1, B2, B3 and B4. The shapes of salient poles B1, B2, B3 and B4 are formed so that each produces the output of the 1X axis combination angle measurement area, and preferably, all the salient poles B1, B2, B3 and B4 have similar shapes.

The measurement area of the 2X axis combination angle area includes salient pole B2 and salient pole B3. The salient pole B1 and salient pole B4 are structured as preliminary measurement areas. Salient pole B1 and salient pole B4 exist and function in the same manner as the salient pole A1 and salient A4, in other words, as the preliminary measurement areas, and therefore they are not described in detail.

The salient poles B1, B2, B3 and B4 and the stator magnetic pole, which has stator windings, are arranged such that the output of the stator secondary windings is a sine wave that corresponds to the variation of the gap permeance when the rotor is rotated.

The rotor 14 in FIG. 2A has a first measurement area in the 1X axis combination angle area, which includes salient pole A2 and salient pole A3. The rotor 14 also has a second measurement area in the 2X axis combination angle area, which includes salient pole B2 and salient pole B3. The limits of the ranges are determined by the line cd and line gh, which intersect the shaft center axis o, as shown in FIG. 2A.

The angle formed by the lines gh and cd is set to be ninety degrees (90°) in the example of FIG. 2A. When the axis combination angle nX is a multiple angle, the number of yoke magnetic poles arranged in the area increases. Therefore, the angle of the nX axis combination angle increases. However, when the preliminary measurement area (salient pole A2 and salient pole A4) is arranged before and after the measurement areas (salient pole A2 and salient pole A3 in FIG. 2A), the preliminary measurement area becomes one-fourth of the area or one-fourth of the angle. There are two areas with different axis combination angles. Therefore, when the preliminary measurement area is limited to one-fourth of the angle, each of the preliminary measurement areas takes the maximum angle of 45°. Thus, for the case of a rotor having different axis combination angle areas including axis combination angle 1X, the preferable setting for each axis combination angle area is a ninety degree range area.

The rotor 14' in FIG. 2C is an example in which the upper half, or first area, is structured as a salient pole shape that is the same as that of the 1X axis combination angle area of FIG. 2A. The lower half, or second area, is formed as a salient pole shape with a 4X axis combination angle, unlike the example of FIG. 2A. In the 4X axis combination angle area, salient poles C1 to C8 are uniformly arranged in a special shape such that each salient pole produces the gap permeance characteristics of the 1X axis combination angle measurement area. The salient poles C3 to C6 are located in the measurement area and preferably have the same shape. When the salient poles C3 to C6 have the same shape, the measurement patterns become the same, allowing easy processing. The areas of salient poles C1, C2, C7 and C8 constitute the preliminary measurement areas. Salient poles C1, C2, C7 and C8 exist and function in the same manner as salient pole A1 and salient pole A4 of FIG. 2A, and are thus not described in detail.

Figure 3A:
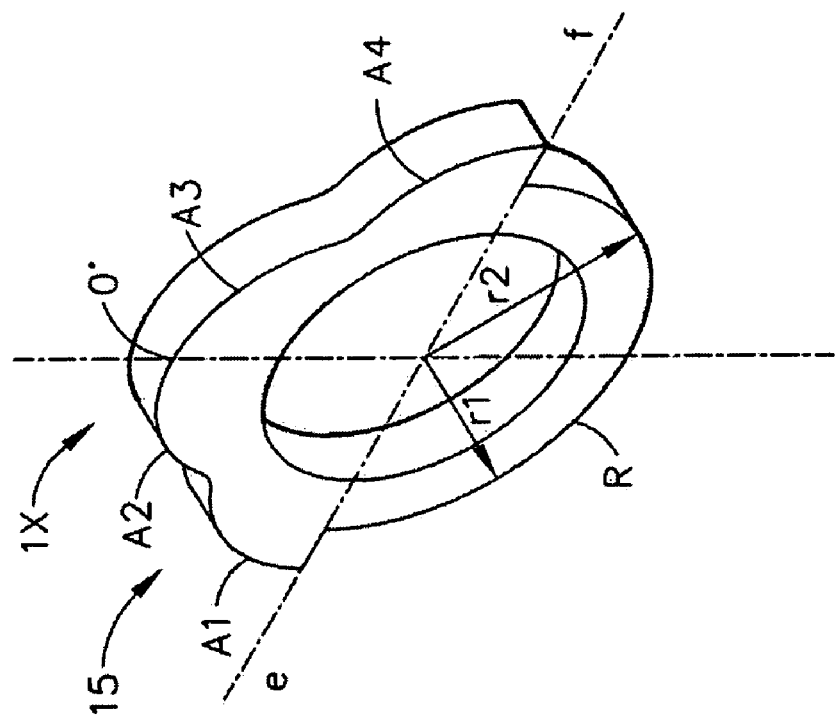
FIG. 3A is a perspective view of a division rotor of the present invention having salient poles with an axis combination angle 1X.
Figure 3C:
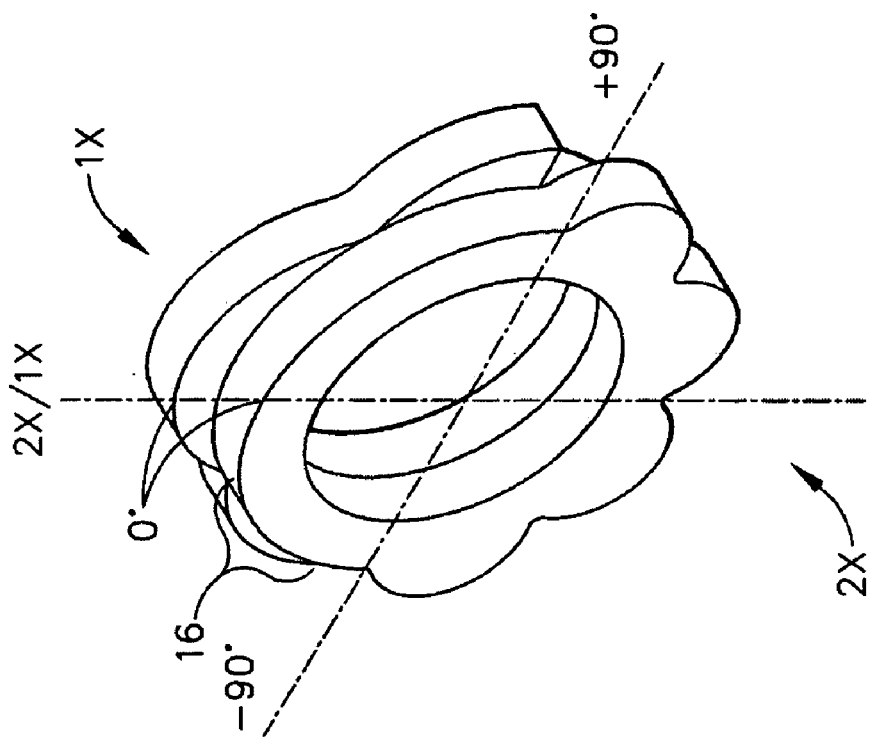
FIG. 3C is a perspective view of a coupled rotor that combines the division rotor of FIG. 3A and the division rotor of FIG. 3B such that their salient pole ranges do not overlap.
Figure 3B:
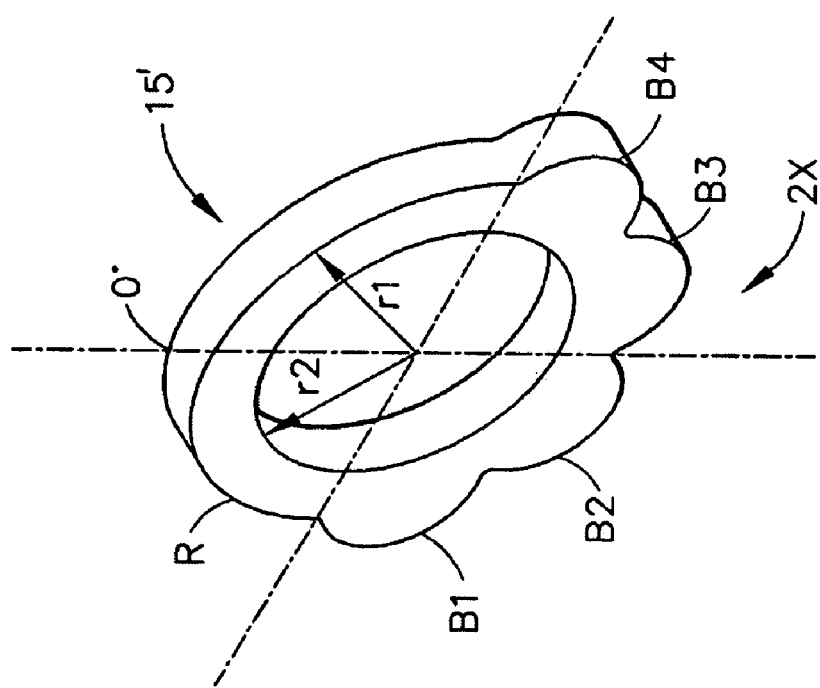
FIG. 3B is a perspective view of a division rotor of the present invention having salient poles with an axis combination angle 2X.

In a further embodiment, a combination type rotor 16 includes areas with different axis combination angles that are formed in different planes by different rotor elements 15, 15'. FIG. 3C shows the combination type rotor 16, which includes combined rotor elements 15 and 15'. FIG. 3A shows a first rotor element 15, in which the salient poles of a 1X axis combination angle area are formed on one half of the circumference. FIG. 3B shows a second rotor element 15' in which the salient poles of a 2X axis combination angle area are formed on one half of the circumference. FIG. 3C shows the combined rotor 16 in which the first rotor element 15 of FIG. 3A and the second rotor element 15' of FIG. 3B are combined, so that the different axis combination angle areas do not overlap with each other.

The rotor element 15 of FIG. 3A has the salient poles of the axis combination angle 1X area of FIG. 2A on one half of the circumference. Semi-rings R, which are determined by arcs of radius r1 and radius r2 are formed on the halves of the rotor elements 15 and 15' that are not occupied by the salient pole ranges, as shown.

The division rotor 15' in FIG. 3B has the salient poles of the 2X axis combination angle area of FIG. 2A on one half of the circumference. A semi-ring R, which is determined by arcs of radius r1 and radius r2 is formed on the opposite half. An arbitrary value of 3X or greater can be selected for the axis combination angle instead of 2X.

The combined rotor 16 in FIG. 3C is formed by combining the first rotor element 15 of FIG. 3A and the second rotor element 15' of FIG. 3B, so that the salient pole areas do not overlap. That is, the different salient pole areas occupy different circumferential areas.

As described above, the combination type rotor 16 is structured by combining the rotor elements with axis combination angles that are different from each other. Therefore, depending on the selection of the axis combination angles, a combined rotor with arbitrary axis magnification can be freely formed.

Figure 4B:
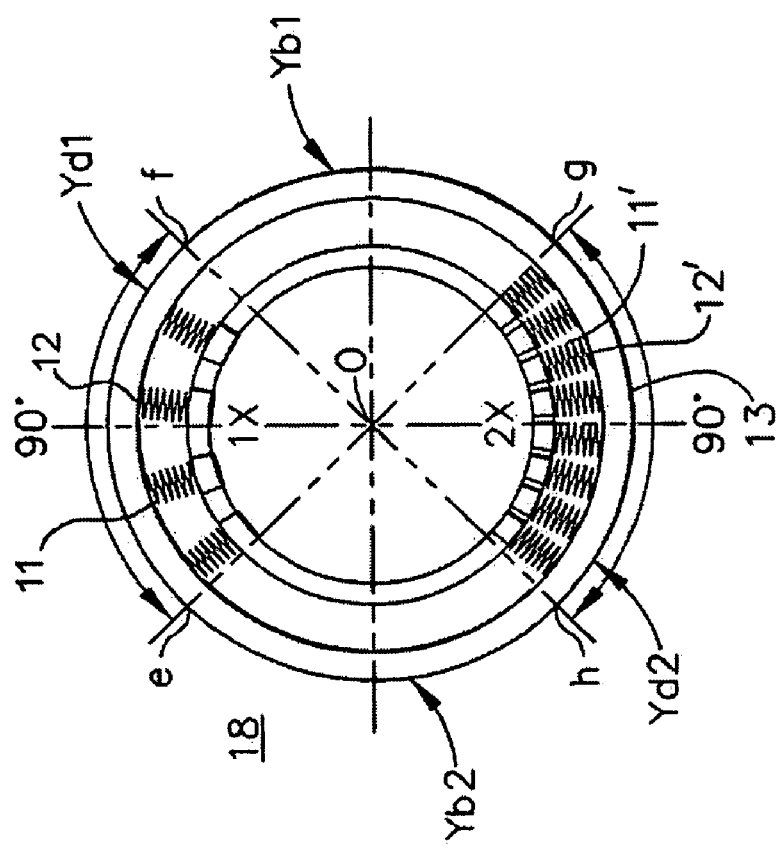
FIG. 4B is a schematic end view of a combination-type stator including stator yokes having stator windings for an axis combination angle 1X and stator windings for an axis combination angle 2X that are arranged in respective 90-degree ranges.
Figure 4A:
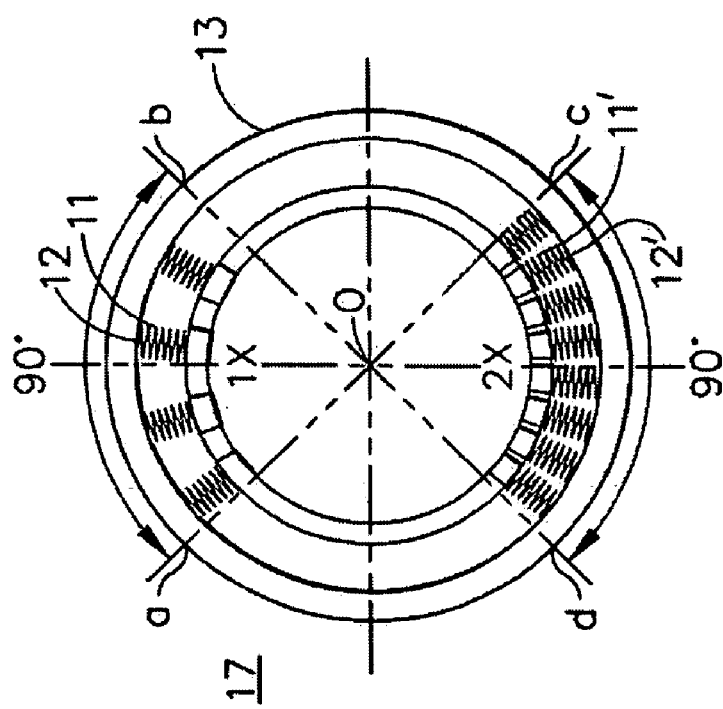
FIG. 4A is a schematic end view of a stator having stator windings for an axis combination angle 1X and an axis combination angle 2X at respective 90-degree ranges.
Figure 5B:
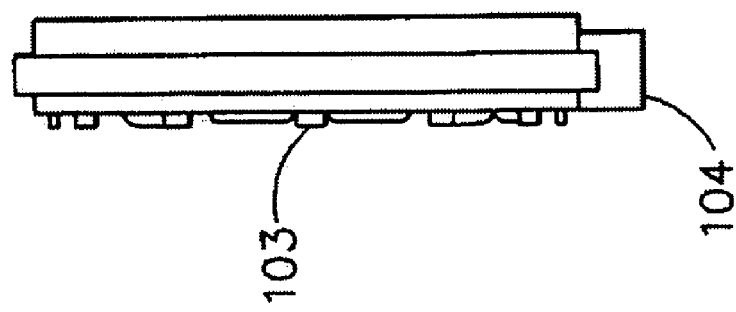
FIG. 5B is a side view of the resolver of FIG. 5A.
Figure 5A:
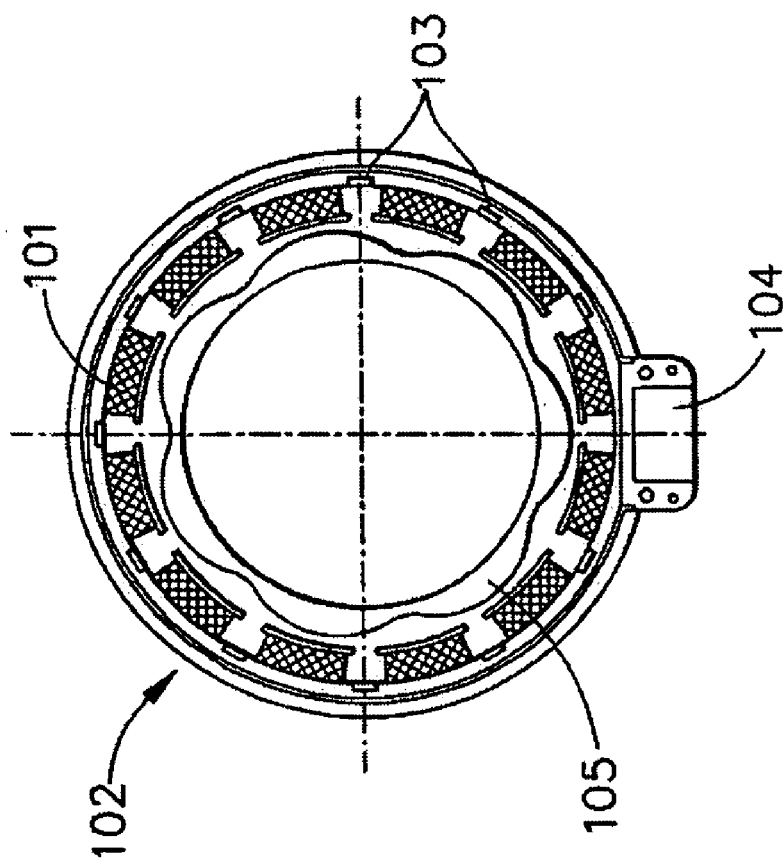
FIG. 5A is a schematic end view of a conventional resolver.

A stator shape in which areas with different axis combination angles are simply formed is illustrated in FIG. 4A. FIG. 4A shows stator 17 with stator magnetic poles having stator windings of a 1X axis combination angle and stator magnetic poles having stator windings of a 2X axis combination angle ninety-degree angle range areas. The stator 17 is used in combination with a rotor having different axis combination angles.

The ninety-degree angle areas that are the stator magnetic pole configuration areas of the stator yoke 13 in FIG. 4A (a-b area and c-d area) are formed by being matched to the measurement areas of the rotor. The 1X axis combination angle area (a-b area) of the stator yoke 13 has four stator magnetic poles 12 at equal angular intervals, and each pole 12 has stator windings 11. The 2X axis combination angle area (c-d area) of the stator yoke 13 has eight stator magnetic poles 12', each having stator windings 11', at equal angular intervals.

Each of the stator magnetic pole configuration areas of stator yoke 13 is structured in combination with the rotor shape. In principle, a plurality of stator magnetic poles are arranged in accordance with the chosen axis combination angle.

Preferably, each of the stator magnetic pole configuration areas of stator yoke 13 is set to be within a ninety-degree range for the reason discussed above in the description of the measurement range of the rotor 14.

There are spaces where no stator magnetic poles are arranged in the b-c area and d-a area of stator yoke 13, which provides sufficient space for the coiling of the stator windings to be done by an automatic winding machine.

In addition, a rotation position output with different axis combination angles can be obtained, which allows absolute position measurement.

FIG. 4B illustrates a combination-type stator shape in which areas with different axis combination angles are formed. FIG. 4B shows a combined stator 18 including pole yoke element Yd1, which includes stator magnetic poles 12 with stator windings 11 in a 1X axis combination angle area, and pole yoke element Yd2, which has stator magnetic poles 12' with stator windings 11' in a 2X axis combination angle area. Joining yoke elements Yb1 and Yb2 are combined with the pole yoke elements Yd1 and Yd2 to form the stator 18. The stator windings 11, 11' include excitation windings and secondary windings, and the output is taken from the secondary windings.

The combined stator 18 in FIG. 4B is structured by combining a pole yoke element Yd1 and pole yoke element Yd2 with the joining elements Yb1 and Yb2 and arranging the pole elements Yd1 and Yd2 oppositely and symmetrically with respect to the shaft center axis o, such that the yokes are arranged in the clockwise order of Yd1-Yb1-Yd2-Yb2 as shown. The yokes Yd1, Yb1, Yd2, Yb2 are formed separately in the e-f, f-g, g-h and h-e areas of the stator, respectively.

In the e-f area of the stator yoke 13, four stator magnetic poles having yoke windings to extract the output of the 1X axis combination angle area are arranged at equal angular intervals. In the g-h area, eight stator magnetic poles having yoke windings to extract the output of the 2X axis combination angle area are arranged at equal angular intervals. In addition to ferromagnetic material, which is used for the pole yokes Yd1 and Yd2, a material with a high magnetic permeability can be used for the joining yokes Yb1 and Yb2. To fix the pole yokes Yd and Yd2 and joining yokes Yb1 and Yb2, removable fasteners such as bolts, welding or adhesives can be used, for example.

The pole yokes of the combined stator 18 are separately formed as stator yokes Yd1 and Yd2, which are used for measurement, and joining stator yokes Yb1 and Yb2, which complete the stator. The separate yoke elements Yd1, Yd2, Yb1, Yb2 are combined to make one stator 13. Therefore, the stator yoke elements Yd1 and Yd2, which have arbitrary axis combination angles, can be combined.

The reason that a ninety degree range for the mechanical angle allows measurement is described as follows. The rotor is structured such that, for a measurement area, salient poles with a 1X axis combination angle are arranged in a range of plus or minus forty-five degrees (±45°) about a zero position, or 0° (the reference position). Salient poles with an axis combination angle nX (n=2) are arranged in an area that is opposite to the 1X axis combination angle area, with respect to a plane that passes through the center axis o. In other words, salient poles with an nX axis combination angle are arranged in a range of plus or minus forty-five degrees (±45°) with respect to a point that is diametrically opposite to the reference position, or at 180°. For the preliminary measurement area, consecutive half salient poles with an axis combination angle 1X are arranged in the area from 45° to 90°, and the area from central angle −45° to the central angle −90°. Then the consecutive half salient poles with an axis combination nX are arranged in the area from the angle 90° to the angle 135° and the area from the angle −90° to the angle −135°.

The stator constitutes the measurement area by arranging stator magnetic poles having stator windings according to the shape of the salient poles of the measurement area of the rotor.

Figure 1A:
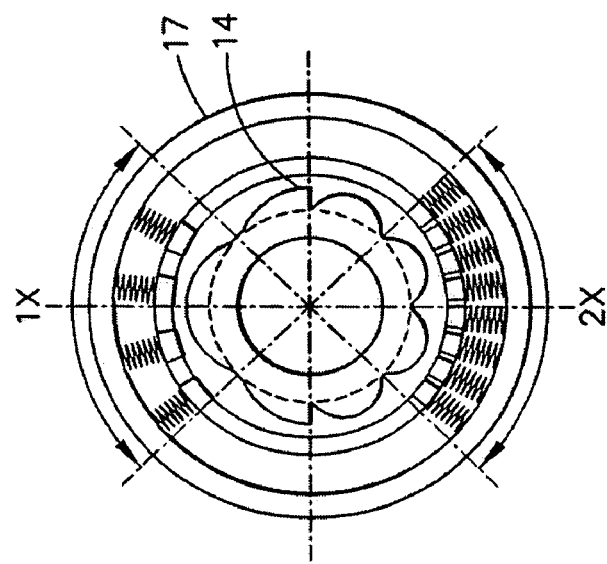
FIG. 1A is an end view diagram of a resolver of the present invention.
Figure 1B:
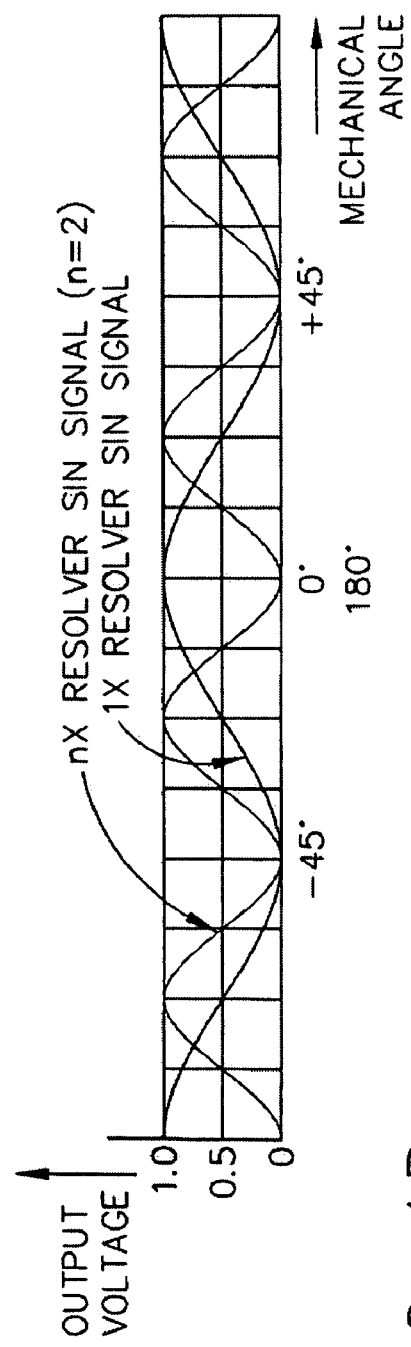
FIG. 1B is a graph showing the R/D converter output of the secondary winding of the resolver of FIG. 1A.

FIG. 1A is a diagram of the resolver of the present invention that combines a rotor 14 and a stator 17, each of which has different axis combination angles. The resolver in FIG. 1A includes the rotor 14 of FIG. 2A and stator 17 of FIG. 4A. FIG. 1B shows the R/D converter output (output voltage characteristics) of the secondary winding of the resolver of FIG. 1A.

The output voltage property is described for the rotor in FIGS. 2A–2C, and in particular, a 1X/2X rotor 14 in which the salient poles of axis combination angle 1X are on one half and the salient poles of axis combination angle 2X are on the other half, as shown in FIG. 2A. A similar concept can be applied in the case of the rotor 14' in FIG. 2C and combined rotor 16 in FIG. 3C.

First, with the rotation of the rotor 14, the sine signal of the 1X resolver varies from an output voltage of zero (mechanical angle −45°) to an output voltage of one (mechanical angle 0°) and then to an output voltage of zero (mechanical angle +45°). The sine signal is generated from the area of the salient poles of the 1X axis combination angle (salient pole A2 and salient pole A3 in FIG. 2A) in the rotor 14.

It can be considered that a separate resolver with axis combination angle nX is operating simultaneously. In the embodiment of FIG. 2A where is n=2, the sine signal of the nX resolver (example of n=2) varies from an output voltage of zero (mechanical angle −45°) to an output voltage of 0.5 (mechanical angle 33.75°) to an output voltage of 1.0 (mechanical angle −22.5°) to an output voltage of 0.5 (mechanical angle −11.25°) to an output voltage of zero (mechanical angle 0°) to an output voltage of 0.5 (mechanical angle +11.25°) to an output voltage of 1.0 (mechanical angle +22.5°) to an output voltage of 0.5 (mechanical angle +33.75°) to an output voltage of zero (mechanical angle +45°), as shown. The sine signal is generated with the rotation of the rotor 14 from the area of the salient poles of the 2X axis combination angle (salient pole B2 and salient pole B3 in FIG. 2A) in the rotor 14.

As described above, the salient poles of the 1X axis combination angle of the rotor 14 are arranged in the area of ±45° with respect to 0°, and therefore, with these salient poles, the output voltage of one cycle is generated. Based on this output voltage, one triangular wave (sawtooth wave) can be generated per 90° angle via the R/D converter. By doing this, although the precision is somewhat low, the absolute rotation position can be detected as an angle.

Next, the salient poles having an axis combination angle 2X for the uniform rotor 14 are arranged in the area of ±45° with respect to 180° as the center, and therefore, with these salient poles, the output voltage of two cycles is generated. Based on this output voltage, two triangular waves (sawtooth waves) can be generated per 90° angle area with the R/D converter. By doing this, the resolution can be increased and the absolute rotation position can be detected in the central angle area with a high precision.

The following is a discussion of reason that the rotation angle sensor employing a resolver including the rotor and the stator allows measurement of absolute position. The rotation angle sensor is a sensor including a resolver, and the resolver includes a rotor having two salient pole areas with different axis combination angles in different 90° angle range areas. The resolver further includes a stator having stator magnetic poles that correspond to the salient poles of the rotor. The rotation angle sensor allows measurement of the absolute rotation position in a ±45° range with respect to a 0° reference position.

Figure 6A:
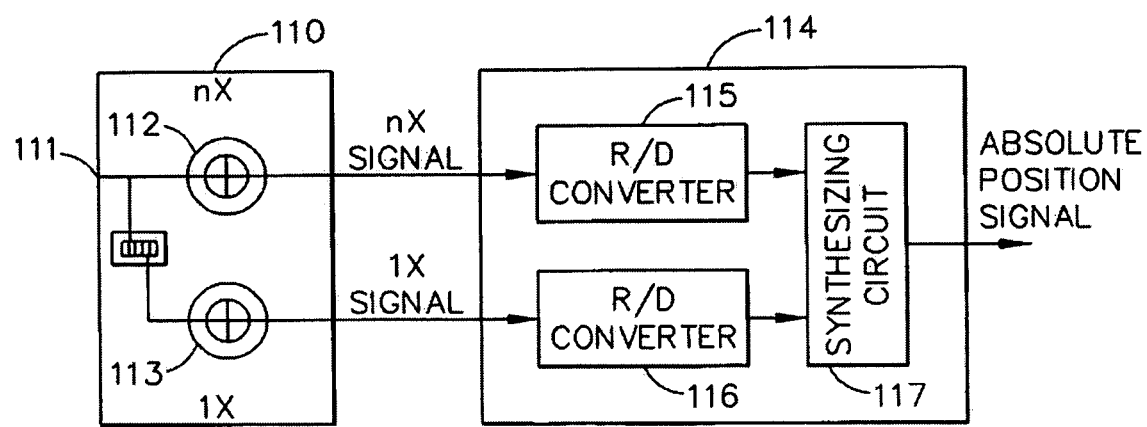
FIG. 6A is a block diagram of a conventional multi-speed resolver system.
Figure 6B:
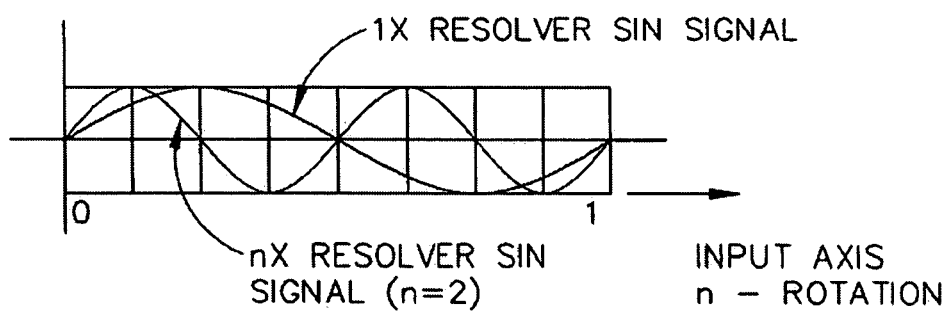
FIG. 6B is a graph illustrating the relationship between the output signal of the conventional resolver of FIG. 6A.

When each of the output signals of the resolver is processed via a digital converter, an absolute position signal output can be obtained. The rotation angle sensor of the present invention is connected to a digital converter similar to the conventional system shown in FIG. 6A. The input of the digital converter is different, compared to the conventional example of FIG. 6A, in that there is a limitation on the range of the obtained resolver output.

The rotation angle sensor system includes the resolver and a digital converter. The resolver includes a rotor with salient poles of a 1X axis combination angle and an nX axis combination angle (n=2) and a stator with stator windings that correspond to the salient poles. That is, the resolver includes a 1X axis combination angle portion and an nX axis combination angle portion. The digital converter includes a resolver/digital (R/D) converter and a synthesizing circuit.

When the rotor is revolved in a state where a reference signal is input to the VR resolver 1X axis combination angle portion, a sine wave signal and a cosine wave signal having one cycle of ±45° with respect to 0°, in which the position is determined, is generated from the gap between the excitation magnetic pole (not shown in the drawing) and the rotor. The sine wave is read from the output windings in a known manner. This sine wave signal is converted to linear output data (triangular wave signal: sawtooth wave signal) by the R/D converter.

When the rotor is revolved in a state where the reference signal is input to the nX axis angle (multiple-pole) portion of the resolver, a sine wave signal and a cosine wave signal having n cycles of ±45° with respect to 0°, in which the position is determined per one pole, is generated from the gap between the excitation magnetic pole (not shown in the drawing) and the rotor. In the case of a 2X axis combination angle, two cycles of a sine wave signal and two cycles of a cosine wave signal are output. The sine wave signal is converted to multiple linear output data (triangular wave signal, or sawtooth wave signal), which correspond to each pole, by the R/D converter.

Figure 6C:
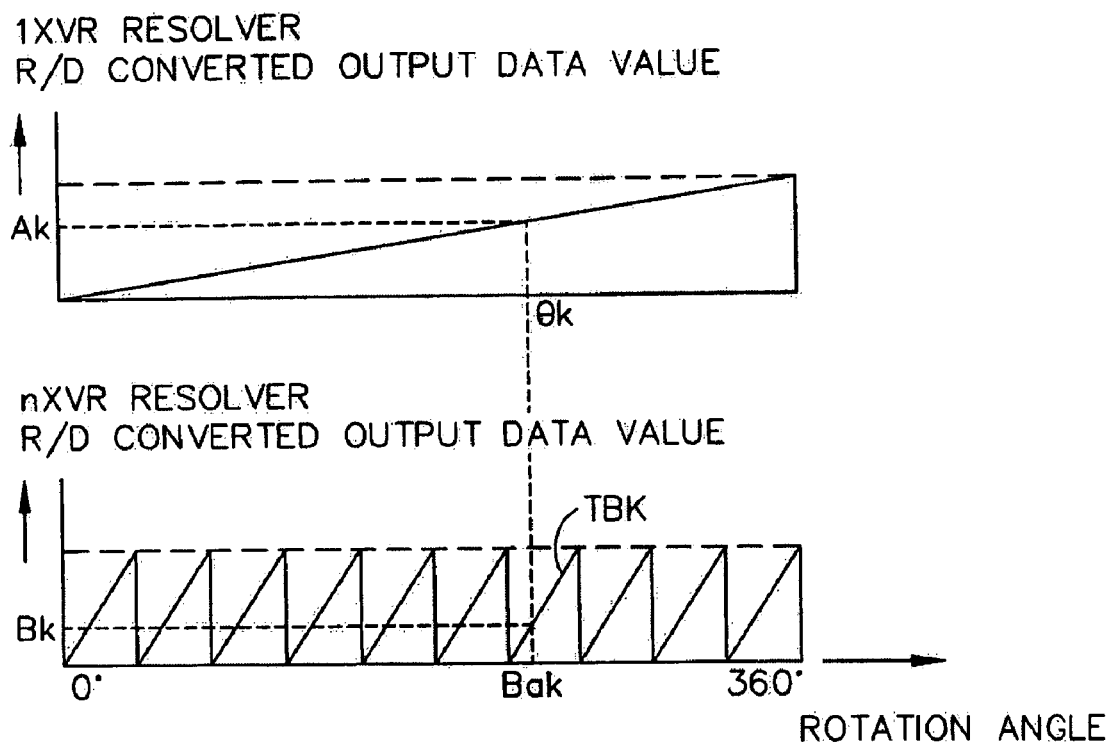
FIG. 6C is a graph that illustrates a method for finding the rotation angle with a conventional multi-speed resolver.
Figure 7:
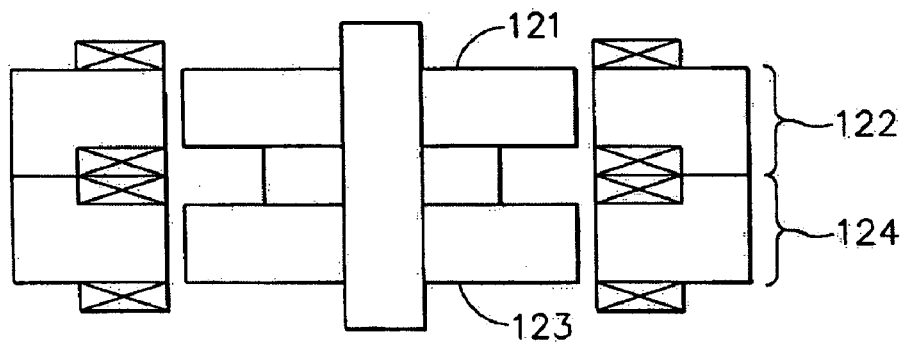
FIG. 7 is a diagrammatic side view of a conventional multi-speed resolver with a plurality of poles.

The operation of the system is similar to the one shown in FIG. 6C. First, the initial position data Ak and Bk of the 1X resolver and nX resolver that correspond to the initial position θk are input. Next, the initial pole TBK of the nX resolver (linear output data) is found from the initial position (θk) data Ak of the 1X resolver. The absolute digital rotation position data Bak is found from this initial pole TBK and the initial position data Bk of the nX resolver.

Thereafter, every time a designated period of time passes, the output data Bk of multiple-pole resolver are input, the above-mentioned calculation is performed, and the rotation position data at each time are found.

The range of the salient poles of the rotor included in a designated area is less than 180 degrees. A configuration for a plurality of stator magnetic poles, which include windings, on the stator yoke are employed so that each of the ranges has a different axis combination angle. Therefore, detection of the absolute rotation position with a high precision is possible with a single resolver. In addition, a light, compact, multi-speed rotation angle sensor with different axis combination angles can be manufactured.

The designated range angle is set to be 90 degrees. One of the different axis combination angles is set to be a single combination angle, and the other axis combination angle is set to be a double or greater combination angle. Therefore, in addition, the range where a stator magnetic pole is arranged can be limited within the 90° angle range. Consequently, stator magnetic poles that are not used for measurement can be omitted.

The rotor is structured so that a plurality of rotor elements having salient poles that correspond to each of the different axis combination angles are combined in a way such that the different salient pole regions do not overlap with each other. The stator magnetic pole is arranged in correspondence to the rotor elements, and therefore, salient poles with different axis combination angles can be easily structured with an arbitrary combination.

The stator yoke may be structured so that stator yoke elements are combined so that elements with the different axis combination angles do not overlap with each other. Therefore, the stator yoke can be easily structured with arbitrary combinations of stator yokes with different axis combination angles.

The present invention allows accurate measurement of the angle position within a designated angle range with a compact and light resolver in which a particular rotor composition and a particular stator composition are combined.

The invention claimed is:

1. A rotation angle sensor, comprising:
a rotor having a first area and a second area, wherein each area occupies 180 degrees or less of the circumference of the rotor, wherein the shape of the first area is different from the shape of the second area, such that the rotor is asymmetric about a plane that includes the axis of the rotor, wherein:
the first area includes a measurement area, and the second area includes a measurement area, and the measurement area of the first area includes a predetermined number of salient poles, and the measurement area of the second area includes a plurality of salient poles;
the number of poles in the second area is an integer multiple of the predetermined number, and
the integer multiple is greater than one; and
a stator, wherein the stator includes a first set and a second set of stator magnetic poles, wherein each set of stator magnetic poles includes windings, and the first set of stator magnetic poles is arranged on a first area of the stator, and the second set of stator magnetic poles is arranged on a second area of the stator, and the first area of the stator is located on an opposite side of the axis of the rotor with respect to the second area of the stator, wherein, when the rotor rotates, an output voltage signal of the second set of magnetic roles has a frequency that is equal to a frequency of an output signal of a winding of the first set of magnetic poles multiplied by the integer of the integer multiple.

2. The rotation angle sensor according to claim 1, wherein the measurement area of the first area of the rotor occupies a ninety degree section of the circumference of the rotor, and the measurement area of the second area of the rotor occupies a ninety degree section of the circumference of the rotor, and the measurement area of the first area is located on an opposite side of the plane with respect to the measurement area of the second area.

3. The rotation angle sensor according to claim 1, wherein the rotor includes a first rotor element, which includes salient poles, and a second rotor element, which includes salient poles, and the first and second rotor elements are combined such that the salient poles of the first rotor element do not overlap with the salient poles of the second rotor element.

4. The rotation angle sensor according to claim 1, wherein the stator includes a first stator yoke element in which the first set of stator magnetic poles are arranged, and a second stator yoke element, in which the second set of stator magnetic poles are arranged, and the first and second stator yoke elements are fixed to one another so that the first set of stator magnetic poles does not overlap with the second set of stator magnetic poles.

5. The rotation angle sensor according to claim 1, wherein the first measurement area is located on one side of the plane, and the second measurement area is located on the other side of the plane.

6. The rotation angle sensor according to claim 1, wherein the salient poles of the first measurement area and the salient poles of the second measurement area lie in a common plane that is perpendicular to the axis of the rotor.

7. A rotation angle sensor, comprising:
a rotor having a first area and a second area, wherein each area occupies 180 degrees or less of the circumference of the rotor, wherein each area has a predetermined number of salient poles, and the number of salient poles in the first area is different from the number of salient poles in the second area, wherein:
the first area of the rotor includes a measurement area, and the second area of the rotor includes a measurement area, and the measurement area of the first area includes a predetermined number of salient poles, and the measurement area of the second area includes a plurality of salient poles;
the measurement area of the first area of the rotor lies on one side of a plane that includes the axis of the rotor, and the measurement area of the second area of the rotor lies on the opposite side of the plane;
the number of salient poles in the second area of the rotor is an integer multiple of the predetermined number; and
the integer multiple is greater than one; and
a stator, wherein the stator includes a first set and a second set of stator magnetic poles, wherein each set of stator magnetic poles includes windings, and the first set of stator magnetic poles is arranged on a first area of the stator, and the second set of stator magnetic poles is arranged on a second area of the stator, and the first area of the stator is located on an opposite side of the axis of the rotor with respect to the second area of the stator, wherein, when the rotor rotates, an output voltage signal of the second set of magnetic poles has a frequency that is equal to a frequency of an output signal of a winding of the first set of magnetic poles multiplied by the integer of the integer multiple.

8. The rotation angle sensor according to claim 7, wherein the measurement area of the first area of the rotor occupies a ninety degree section of the circumference of the rotor, and the measurement area of the second area of the rotor occupies a ninety degree section of the circumference of the rotor, and the measurement area of the first area of the rotor is located on an opposite side of the plane with respect to the measurement area of the second area of the rotor.

9. The rotation angle sensor according to claim 7, wherein the rotor includes a first rotor element, which includes salient poles, and a second rotor element, which includes salient poles, and the first and second rotor elements are combined such that the salient poles of the first rotor element do not overlap with the salient poles of the second rotor element.

10. The rotation angle sensor according to claim 7, wherein the stator includes a first stator yoke element, in which the first set of stator magnetic poles are arranged, and a second stator yoke element, in which the second set of stator magnetic poles are arranged, and the first and second stator yoke elements are fixed to one another so that the first set of stator magnetic poles does not overlap with the second set of stator magnetic poles.

11. A rotation angle sensor, comprising:
a rotor having a first area and a second area, wherein each area occupies 180 degrees or less of the circumference of the rotor, wherein the shape of the first area is different from the shape of the second area, such that the rotor is asymmetric about a plane that includes the axis of the rotor; and
a stator, wherein the stator includes a first set and a second set of stator magnetic poles, wherein each set of stator magnetic poles includes windings, and the first set of stator magnetic poles is arranged on a first area of the stator, and the second set of stator magnetic poles is arranged on a second area of the stator, and the first area is opposite to the second area wherein:
the first area includes a measurement area, and the second area includes a measurement area, and the measurement area of the first area includes a predetermined number of salient poles, and the measurement area of the second area includes a plurality of salient poles, wherein the number of poles in the second area is an integer multiple of the predetermined number, and the integer of the integer multiple is greater than one;
the first set of stator magnetic poles includes a predetermined number of magnetic poles, and the second set of stator magnetic poles includes a plurality of stator magnetic poles, the number of which is the integer multiple of the number of magnetic poles in the first set; and
when the rotor rotates, an output voltage signal of a winding of the second set of magnetic poles has a frequency that is equal to a frequency of an output signal of a winding of the first set of magnetic poles multiplied by the integer multiple.

12. The rotation angle sensor according to claim 11, wherein the salient poles of the first measurement area and the salient poles of the second measurement area lie in a common plane that is perpendicular to the axis of the rotor.

13. A rotation angle sensor, comprising:
a rotor having a first area and a second area, wherein each area occupies 180 degrees or less of the circumference of the rotor, wherein the shape of the first area is different from the shape of the second area, such that the rotor is asymmetric about a plane that includes the axis of the rotor, wherein:
the first area includes a measurement area, and the second area includes a measurement area, and the measurement area, of the first area includes a predetermined number of salient poles, and the measurement area of the second area includes a plurality of salient poles, wherein the salient poles of the first measurement area and the salient poles of the second measurement area lie in a common plane that is perpendicular to the axis of the rotor;
the number of poles in the second area is an integer multiple of the predetermined number; and
the integer multiple is greater than one; and
a stator, wherein the stator includes a first set and a second set of stator magnetic poles, wherein each set of stator magnetic poles includes windings, and the first set of stator magnetic poles is arranged on a first area of the stator, and the second set of stator magnetic poles is arranged on a second area of the stator, and the first area of the stator is located on an opposite side of the axis of the rotor with respect to the second area of the stator.

* * * * *

UNITED STATES PATENT AND TRADEMARK OFFICE
CERTIFICATE OF CORRECTION

| | |
|---|---|
| PATENT NO. | : 7,138,796 B2 |
| APPLICATION NO. | : 10/840503 |
| DATED | : November 21, 2006 |
| INVENTOR(S) | : Taiichi Miya |

It is certified that error appears in the above-identified patent and that said Letters Patent is hereby corrected as shown below:

Delete Claims 4 & 13, and insert Claims 4 & 13 as follows:

4. The rotation angle sensor according to claim 1, wherein the stator includes a first stator yoke element, in which the first set of stator magnetic poles are arranged, and a second stator yoke element, in which the second set of stator magnetic poles are arranged, and the first and second stator yoke elements are fixed to one another so that the first set of stator magnetic poles does not overlap with the second set of stator magnetic poles.

13. A rotation angle sensor, comprising:

a rotor having a first area and a second area, wherein each area occupies 180 degrees or less of the circumference of the rotor, wherein the shape of the first area is different from the shape of the second area, such that the rotor is asymmetric about a plane that includes the axis of the rotor, wherein:

the first area includes a measurement area, and the second area includes a measurement area, and the measurement area of the first area includes a predetermined number of salient poles, and the measurement area of the second area includes a plurality of salient poles, wherein the salient poles of the first measurement area and the salient poles of the second measurement area lie in a common plane that is perpendicular to the axis of the rotor;

the number of poles in the second area is an integer multiple of the predetermined number; and

UNITED STATES PATENT AND TRADEMARK OFFICE
CERTIFICATE OF CORRECTION

PATENT NO.         : 7,138,796 B2
APPLICATION NO. : 10/840503
DATED                 : November 21, 2006
INVENTOR(S)       : Taiichi Miya It is certified that error appears in the above-identified patent and that said Letters Patent is hereby corrected as shown below:

Delete Claims 4 & 13, and insert Claims 4 & 13 as follows: (cont'd)

the integer multiple is greater than one; and a stator, wherein the stator includes a first set and a second set of stator magnetic poles, wherein each set of stator magnetic poles includes windings, and the first set of stator magnetic poles is arranged on a first area of the stator, and the second set of stator magnetic poles is arranged on a second area of the stator, and the first area of the stator is located on an opposite side of the axis of the rotor with respect to the second area of the stator.

Signed and Sealed this

Fifth Day of June, 2007

JON W. DUDAS
*Director of the United States Patent and Trademark Office*